United States Patent [19]

Carlson

[11] 4,253,739
[45] Mar. 3, 1981

[54] THERMALLY COMPENSATED MIRROR

[75] Inventor: Russell L. Carlson, North Palm Beach, Fla.

[73] Assignee: United Technologies Corporation, Hartford, Conn.

[21] Appl. No.: 51,656

[22] Filed: Jun. 25, 1979

[51] Int. Cl.$^3$ .......................... G02B 7/18; G02B 5/08
[52] U.S. Cl. .................................................. 350/310
[58] Field of Search .............................. 350/310, 320

[56] References Cited

U.S. PATENT DOCUMENTS

| 3,637,296 | 1/1972 | McLafferty et al. | 350/310 |
| 3,645,608 | 2/1972 | Staley et al. | 350/310 |
| 3,841,737 | 10/1974 | Rambauske et al. | 350/310 |
| 3,909,118 | 9/1975 | Schmidt | 350/310 |
| 4,006,972 | 2/1977 | Nachtman | 350/310 |

Primary Examiner—Jon W. Henry
Attorney, Agent, or Firm—Lawrence A. Cavanaugh

[57] ABSTRACT

A mirror adapted for compensating thermal distortions resulting from the absorption of energy in a beam of radiation incident thereon is disclosed. Coolant channels disposed within the mirror proximate the reflective surface are adapted for passing coolant therethrough to minimize the temperature rise in the mirror resulting from the absorbed energy and the resulting thermal distortions therein. Heating channels disposed within the mirror proximate the back surface are adapted for passing a heating fluid therethrough for increasing the temperature of the back surface to induce thermal distortions therein, said induced thermal distortions having a direction and magnitude to counter the distortions resulting from the absorption of radiant energy at the reflective surface of the mirror.

4 Claims, 7 Drawing Figures

THERMALLY COMPENSATED MIRROR

BACKGROUND OF THE INVENTION

This invention relates to mirrors and more particularly to a mirror having means for compensating thermal distortions therein resulting from heat generated by the absorption of radiation at the reflective surface of the mirror.

Mirrors adapted for use with high power laser beams are subject to severe thermal gradients resulting from the absorption of a portion of the high power beam at the reflective surface of the mirror. The thermal gradients result in a distortion of the mirror with a corresponding distortion in the wavefront of the radiation reflected from the reflective surface.

One method well known in the art for minimizing thermal distortion within mirrors is to flow a coolant therethrough in heat exchanger relationship with the mirror. Typically, either the faceplate of the mirror or the mirror substrate is cooled to minimize the temperature variations within the mirror. For example, Staley in U.S. Pat. No. 3,645,608 filed May 5, 1970 discloses a mirror having a reflective surface formed on a flat side of a channel plate which is attached to a substrate and a coolant manifold system disposed within the channel plate for passing coolant therethrough in heat exchanger relationship with the channel plate and substrate. McLafferty et al in U.S. Pat. No. 3,637,296 filed June 4, 1970 also discloses a mirror, including a manifold system disposed proximate a reflective surface, for passing coolant therethrough. These and similar prior art devices typically utilize the coolant for minimizing the temperature variations in the mirror during operation thereby minimizing thermal deformations. However, these prior art cooled mirrors do not provide for compensating the thermal distortions in the mirror resulting from the absorption of heat therein.

A mirror adapted for compensating thermal distortions is disclosed by Hofnagel in U.S. Pat. No. 3,609,589 filed Sept. 3, 1968. The mirror is formed by bonding a plurality of plates of differing materials to form the mirror substrate. A top plate having one side optically polished provides the reflective surface of the mirror. Each of the plates forming the substrate is selected to have a thickness and a coefficient of thermal expansion such that the tendency of the mirror to warp in one direction due to thermal gradients is opposed by and preferentially balanced in an opposite direction by the differential expansion of the additional plates such that the selected configuration of the mirror is retained over a range of temperature gradients. Typically the back plate of the mirror is formed of a material having a substantially higher coefficient of an expansion than the material of the top plate. The greater thermal expansion of the back plate tends to cause the mirror to deform with a curvature opposite to the curvature resulting from the thermal yield distortion of the top plate. This mirror is limited to prescribed restorative deformation and does not have the capability of responding to variations in the intensity distribution or energy level of an incident beam of radiation to compensate the resulting variation in the distortions of the top plate.

SUMMARY OF THE INVENTION

A primary object of the present invention is to minimize the thermal distortion of a mirror subject to an incident flux having a high power density.

In accordance with the present invention, a mirror adapted for compensating thermal distortion comprises a substrate, a faceplate having a first side with a reflective surface and a second side attached to a top surface of the substrate, a back plate having a first side attached to a bottom surface of the substrate said back plate defining a back of the mirror, means disposed within the mirror proximate the reflective surface for cooling said mirror, means for providing coolant to the means for cooling the mirror, means disposed within the mirror proximate the bottom surface of the substrate for heating the back of the mirror and means for providing heat to the means for heating the back of the mirror.

In accordance further with the present invention a fluid is passed through coolant channels within a mirror proximate a reflective surface of the mirror in heat exchanger relationship thereto for removing heat energy absorbed therein to minimize temperature increases within the mirror and the resulting thermal distortions. Additionally, the back of the mirror is heated to induce thermal distortions therein, said induced thermal distortions having a magnitude and direction tending to counterbalance distortions in the mirror resulting from a thermal gradient across the mirror generated by the absorption of radiant energy in the faceplate.

In one embodiment the means for cooling the mirror and the means for heating the back of the mirror are in flow communication with one another through a coupling manifold disposed within the substrate. In this embodiment fluid passing through the coolant channels also passes through the heating channels. The heat absorbed by the fluid while passing through the coolant channels is utilized to heat the back of the mirror while passing through the heating channels to induce thermal distortions therein.

In a further embodiment the temperature, flow rate and pressure of a heating fluid passing through the heating channels are controlled independently of the temperature, flow rate and pressure of a coolant passing through the coolant channels to provide a controlled induced thermal distortion of the mirror. In a still further embodiment the back of the mirror is heated by electrical means to provide the induced thermal distortions.

A primary feature of the present invention is the utilization of a coolant to minimize thermal distortion of a mirror by the absorption of radiant energy coupled with the utilization of heating means proximate the back of the mirror to provide controlled thermally induced distortions therein to compensate the distortion resulting from the absorption of radiant energy.

A primary advantage of the present invention is the ability to regulate the amount of thermal distortion induced in the back of the mirror to compensate for variable distortions in the mirror resulting from variable energy absorbed from the beam of radiation incident onto the mirror.

The foregoing and other objects, features and advantages of the present invention will become more apparent in the light of the following detailed description of preferred embodiments thereof as discussed and illustrated in the accompanying drawing.

DESCRIPTION OF THE PREFERRED EMBODIMENT

Figure 1:
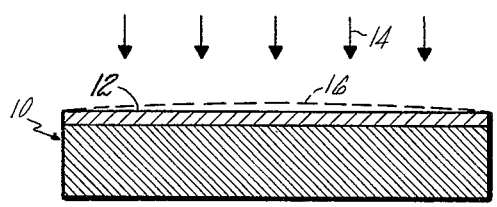
FIGS. 1 and 2 are sectional views showing the thermal distortion of prior art mirrors.
Figure 2:
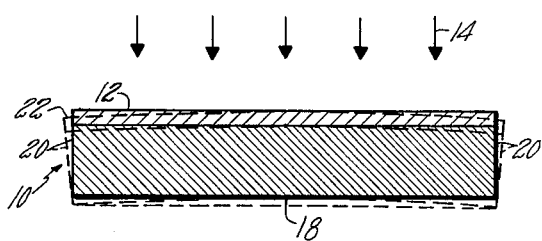
Figure 3:
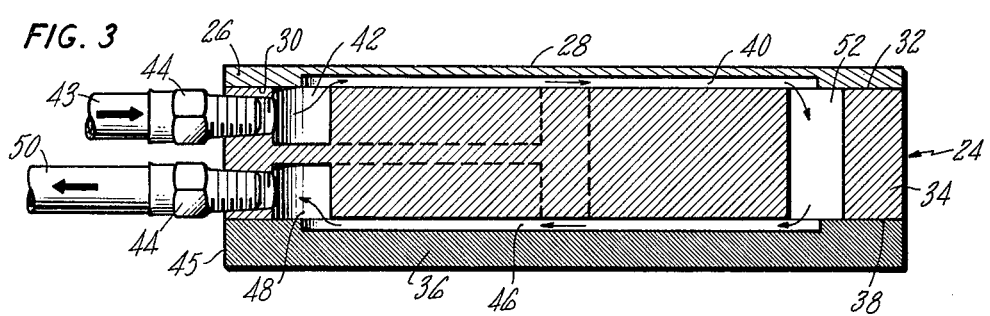
FIG. 3 is a sectional view of a mirror constructed in accordance with the present invention.

Referring now to FIGS. 1 and 2 wherein simplified pictorial representations of two types of thermal distortion are illustrated as occur in typical prior art mirrors. As shown, a mirror 10 having a reflective surface 12 is illuminated by radiation 14 from a high power source such as a laser (not shown). The heat produced by radiation absorbed within the reflective surface increases the temperature of the mirror promoting thermal growth therein. FIG. 1 illustrates a first type of thermal distortion wherein a portion of the mirror juxtaposed the reflective surface, such as a faceplate as shown in FIG. 3, experiences thermal growth in a direction essentially perpendicular to the reflective surface as illustrated by the bow-like dashed line 16 shown in highly exaggerated proportions for illustrative purposes. A second type of distortion is shown in FIG. 2 wherein heat generated by the absorption of radiation within the reflective surface is conducted through the thickness of the mirror to a back surface 18 producing a temperature gradient therethrough with the reflective surface at a higher temperature than the back surface. This temperature condition results in the portion of the mirror juxtaposed the reflective surface undergoing greater thermal growth in the radial direction than the growth of the back surface resulting in a bending distortion of the mirror. This type of deformation is shown highly exaggerated for illustrative purposes by the dashed lines 20 wherein the radial extremities 22 of the reflective surface 12 are typically displaced in a direction toward the back of the mirror. Typically, these two types of mirror distortion contribute in substantially equal amounts to the total distortion of a mirror. As noted hereinbefore cooling the mirror by means well known in the art can reduce the amount of deformation occurring during operation. However the deformation is not eliminated.

Figure 4:
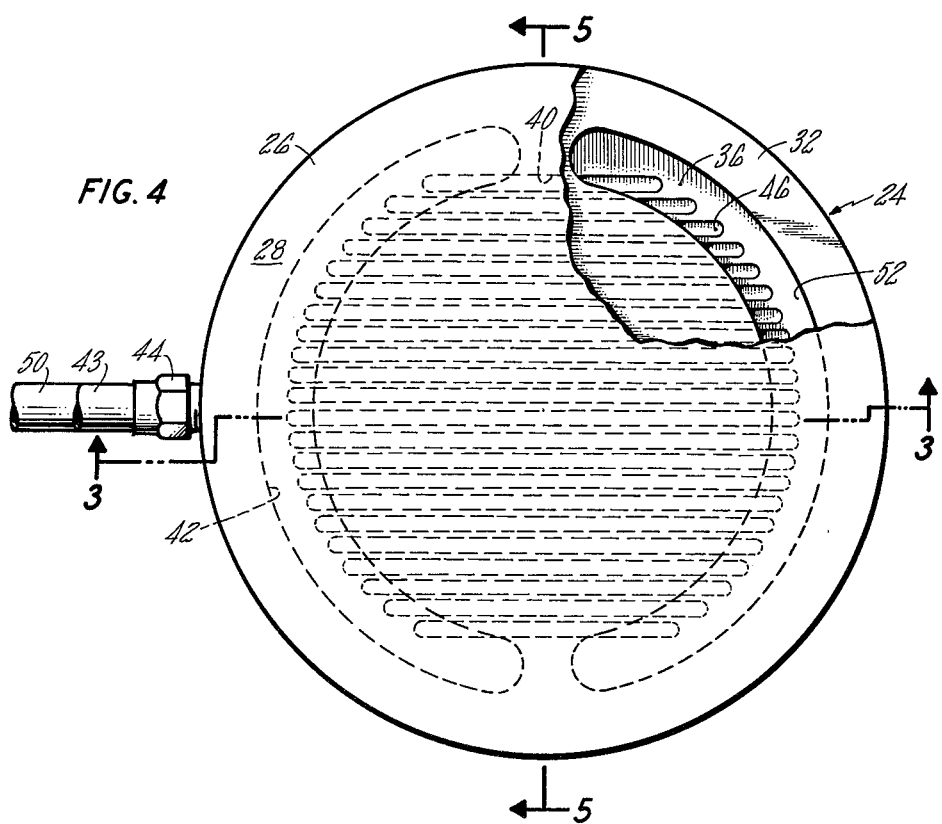
FIG. 4 is a cutaway top view of a mirror configured in accordance with the present invention.

Referring now to FIG. 3 wherein a sectional view of a mirror 24 constructed in accordance with the present invention is shown. The mirror includes a faceplate 26 having a reflective surface 28 disposed on one side thereof and a back surface 30 fixedly attached to a top 32 of a relatively thick substrate 34, and a back plate 36 fixedly attached to the bottom surface 38 of the substrate. A plurality of coolant channels 40 are disposed within the bottom of the faceplate 26 for passing coolant therethrough in heat exchanger relationship with the faceplate. As also shown in FIG. 4, which illustrates a top view of a typical mirror embodying the present invention, one end of each of the coolant channels 40 is in flow communication with an inlet manifold 42 which is connected by an inlet pipe 43 to a source of coolant (not shown) by a coupler 44 which passes through the side 45 of the mirror into the inlet manifold. Heating channels 46 disposed within the back plate juxtaposed the bottom surface of the substrate are adapted for passing heating fluid therethrough in heat exchanger relationship with the back plate. One end of each of the heating channels communicates with an exit manifold 48. The exit manifold is connected by couplers 44 which pass through the side 45 to an exit pipe 50 adapted for passing the heating fluid from the mirror. It is to be recognized that both the coolant and heating fluid may be recirculated through the mirror by means well known in the art. A connector channel 52, disposed within the substrate 34 diametrically opposed the inlet and exit manifolds 42, 48 respectively, connects the coolant channels and the heating channels to enable fluid to pass therebetween.

It is to be recognized that the present invention may be practiced with coolant channels 40 located within the substrate proximate the faceplate and/or heating channels 46 within the substrate proximate the back plate.

In the operation of the present invention, coolant, such as water or the like, passes from a source (not shown) through the coupler 44 to the inlet manifold 42 by means well known in the art. The coolant passes in heat exchanger relationship with the faceplate 26 through the coolant channels 40 for extracting heat generated by the absorption of radiation or the like within the faceplate. A portion of the heat energy absorbed in the faceplate is coupled into the coolant as the coolant flows through the coolant channels 40 across the width of the faceplate. The heat absorbed within the faceplate produces a temperature rise within the mirror resulting in thermal growth of the mirror as hereinbefore discussed with a corresponding thermal deformation. The heat absorbed within the coolant raises the temperature of the coolant from an initial temperature $T_0$ to a higher temperature $T_1$ as the coolant flows into the connector channel. This higher temperature coolant flows through the connector channel 52 into the heating channels 46 where heat from the coolant (now a heating fluid) is coupled into the bottom 38 of the substrate and into the back plate 36 thereby increasing the temperature of the back plate and the bottom of the substrate. The heating fluid is then passed through the exit manifold 48 and out of the mirror through the exit pipe 50.

For the type of distortion shown in FIG. 2, the increased temperature of the back plate and bottom of substrate induces thermal growth therein resulting in a distortion of the mirror opposite in direction to the distortion generated by heat absorbed in the reflective surface counterbalancing the distortion therein resulting in a low net distortion of the mirror. It is to be recognized that the material of the back plate can be selected to have a coefficient of thermal expansion greater than the coefficient of expansion of the faceplate such that a smaller temperature rise in the back plate compared to the temperature rise in the faceplate will result in a distortion of the back plate equal and opposite to the distortion of the faceplate resulting in no net distortion of the mirror. It is also to be recognized that the faceplate, the substrate and the back plate may each be selected to have a coefficient of expansion and thickness tailored to provide an essentially zero net distortion of the mirror.

Referring again to FIG. 4, the coolant channels 40 formed within the faceplate extend from the inlet manifold 42 to the coupling manifold 52. This configuration for the coolant manifold is substantially identical to the cooling means as disclosed in U.S. Pat. No. 3,637,296 as hereinbefore referenced which is held by a common assignee with the present application and is incorporated herein by reference. The heating channels 46 within the back plate 36 as shown in FIG. 3 and the exit manifold 48 disposed within the substrate, are substantially identical to the mirror image of the coolant channels 40 and inlet manifold 42 as shown in FIG. 4 and represent an improvement of the mirror as disclosed in U.S. Pat. No. 3,637,296.

Figure 5:
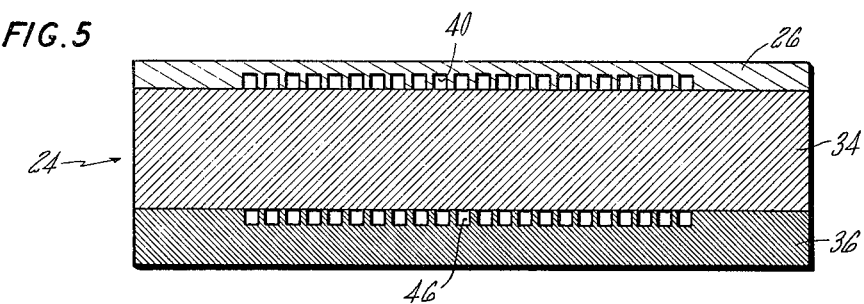
FIG. 5 is a view of the present invention taken along the line 5—5 as shown in FIG. 4.

Referring now to FIG. 5 which is a view of the configuration as shown in FIG. 4 along the line 5—5 showing a plurality of coolant channels 40 within the faceplate 26 and the plurality of heating channels 46 disposed within the back plate 36.

Figure 6:
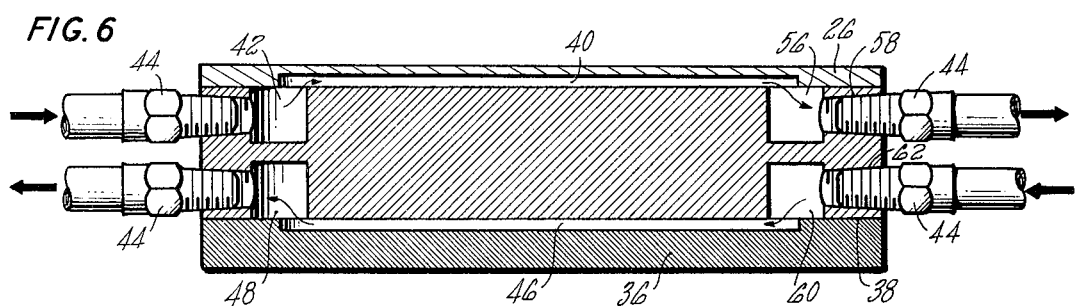
FIG. 6 is an embodiment of the view of the present invention shown in FIG. 3.

In the embodiment of the present invention as shown in FIG. 3, the temperature of the heating fluid passing through the heating channels 46 is limited by the amount of energy absorbed by the coolant fluid as it passes in heat exchanger relationship with the faceplate. FIG. 6 shows an embodiment of the present invention wherein the temperature of the heating fluid can be controlled independently of the temperature of the coolant fluid. A coolant exit manifold 56 disposed within the substrate 34 diametrically opposite the inlet manifold 42 is adapted for passing the coolant, flowing through the coolant channels 40, out of the mirror through a coolant exit 58. A coupler 44 engaged with the coolant exit is adapted for passing the coolant to a recirculator (not shown) or to the atmosphere by means well known in the art. A heating fluid entrance manifold 60 disposed within the bottom surface 38 of the substrate diametrically opposite the exit manifold 48 is connected to a heating fluid entrance 62 adapted for engaging a coupler 44 attached to a source of heating fluid (not shown). The heating fluid entrance manifold is in flow communication with the heating channels.

In the operation of the embodiment shown in FIG. 6 coolant is passed into the mirror through the inlet manifold 42 and flows out of the mirror through the coolant exit manifold 56. Heating fluid flows into the mirror through the heating fluid entrance manifold 60 and passes in heat exchanger relationship with the back plate 36 through the heating channels 46 and passes out of the mirror through the exit manifold 48. In this embodiment the temperature of the heating fluid may be varied by external means well known in the art to obtain essentially any desired temperature of the back plate. It is to be recognized that the coolant and heating fluid may be any desired fluid and may be the same fluid and that the present invention may be practiced in either a closed or open cycle configuration. The ability to increase the temperature of the back plate to a temperature greater than the temperature of the faceplate provides the ability to distort the back plate to compensate for the distortions as shown in FIG. 1.

Figure 7:
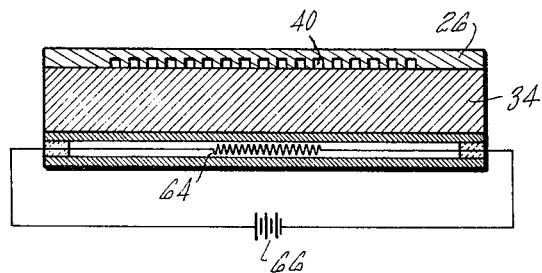
FIG. 7 is an embodiment of the invention as shown in FIG. 3.

Referring now to FIG. 7 wherein a further embodiment of the present invention is shown. The back plate is heated electrically by utilizing a resistance heating unit 64 in contact with its back plate within the heating channels. The heating unit is powered by an electrical energy source 66 and is capable of producing any desired temperature within the back plate.

Although the invention has been shown and described with respect to the preferred embodiment thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. A thermally compensated mirror comprising:
   a substrate having a top surface and a bottom surface;
   a faceplate having a first side with a reflector surface and a second side attached to the top surface of said substrate;
   a back plate having a first side attached to the bottom surface of said substrate and a second side defining the back of the mirror;
   a plurality of coolant channels disposed within the mirror in heat exchanger relationship with said faceplate and said substrate and adapted for passing coolant therethrough;
   an inlet manifold disposed within said substrate in flow communication with one end of each of said coolant channels;
   a plurality of heating channels disposed within the mirror in heat exchanger relationship with said back plate and said substrate and adapted for passing a heating fluid therethrough;
   an exit manifold disposed within said substrate in flow communication with one end of each of said heating channels;
   a connector channel disposed within the substrate and in flow communication with a second end of each of said coolant channels and a second end of each of said heating channels, for passing fluid flowing through the coolant channels to said heating channels; and
   means for providing coolant to said inlet manifold.

2. A thermally compensated mirror comprising:
   a substrate having a top surface and a bottom surface;
   a faceplate having a first side with a reflector surface and a second side attached to the top surface of said substrate;
   a back plate having a first side attached to the bottom surface of said substrate and a second side defining the back of the mirror;
   faceplate cooling means including a plurality of coolant channels disposed within the mirror in heat exchanger relationship with said faceplate and said substrate, a coolant inlet manifold in flow communication with one end of each of said coolant channels, and a coolant exit manifold in flow communication with a second end of each of said coolant channels;
   back plate heating means including a plurality of heating channels disposed within the mirror in heat exchanger relationship with said back plate and said substrate, a heating fluid inlet manifold in flow communication with one end of each of said heating channels, and a heating fluid exit manifold in flow communication with a second end of each of said heating channels;
   means for providing a coolant to said coolant inlet manifold; and
   means for providing a heating fluid to said heating fluid inlet manifold.

3. A thermally compensated mirror comprising:
   a substrate having a top surface and a bottom surface;
   a faceplate having a first side with a reflector surface and a second side attached to the top surface of said substrate;

a back plate having a first side attached to the bottom surface of said substrate and a second side defining the back of the mirror;

faceplate cooling means, including a plurality of coolant channels disposed within the mirror in heat exchanger relationship with said faceplate and said substrate, for cooling said faceplate; and electrical heating means disposed in heat exchanger relationship with said back plate and said substrate for heating the back of the mirror.

4. A method for compensating thermal distortions within a mirror exposed to a high power beam of incident energy comprising:

passing a coolant through the mirror proximate a reflective surface of said mirror in heat exchanger relationship thereto for minimizing the temperature increase and resulting thermal distortions within the mirror resulting from the absorption of radiation incident onto the reflective surface; and heating a back of said mirror by electrical means to induce thermal distortion therein wherein said induced thermal distortion has a direction and magnitude tending to compensate the thermal distortion of the mirror resulting from the absorption of radiant energy at the reflective surface.

* * * * *